United States Patent
Devos et al.

(10) Patent No.: US 11,068,014 B1
(45) Date of Patent: Jul. 20, 2021

(54) MANUAL PARK RELEASE SYSTEM WITH TWIST LOCK MECHANISM

(71) Applicant: HI-LEX CONTROLS, INC., Rochester Hills, MI (US)

(72) Inventors: Matthew Devos, Rochester Hills, MI (US); Gregory P. Hlatky, II, Rochester Hill, MI (US)

(73) Assignee: HI-LEX CONTROLS, INC., Rochester Hills, MI (US)

( * ) Notice: Subject to any disclaimer, the term of this patent is extended or adjusted under 35 U.S.C. 154(b) by 0 days.

(21) Appl. No.: 17/143,784

(22) Filed: Jan. 7, 2021

Related U.S. Application Data (60) Provisional application No. 62/961,756, filed on Jan. 16, 2020.

(51) Int. Cl.
- *F16C 1/12* (2006.01)
- *G05G 5/00* (2006.01)
- *B60T 7/10* (2006.01)
- *G05G 1/04* (2006.01)

(52) U.S. Cl.
CPC ............... *G05G 5/005* (2013.01); *B60T 7/104* (2013.01); *F16C 1/12* (2013.01); *G05G 1/04* (2013.01); *F16C 2326/01* (2013.01)

(58) Field of Classification Search
CPC .......... G05G 1/04; G05G 5/005; B60T 7/104; F16C 1/12; F16C 2326/01
See application file for complete search history.

(56) References Cited

U.S. PATENT DOCUMENTS

| | | | |
|---|---|---|---|
| 4,099,593 A * | 7/1978 | Schultz | B60R 25/04 109/59 R |
| 5,358,292 A * | 10/1994 | Van Wiebe | E05B 53/003 292/125 |
| 6,253,522 B1 * | 7/2001 | Sølbeck | E04G 5/12 52/698 |
| 10,030,770 B2 | 7/2018 | Devos | |
| 10,094,471 B2 | 10/2018 | Devos | |
| 2008/0100086 A1 * | 5/2008 | Vermeersch | G05G 1/04 296/70 |
| 2012/0234057 A1 * | 9/2012 | Feibelman | A47F 7/024 70/58 |
| 2014/0217756 A1 * | 8/2014 | Tanoguchi | E05B 77/38 292/336.3 |

(Continued)

*Primary Examiner* — Richard W Ridley
*Assistant Examiner* — Brian J McGovern
(74) *Attorney, Agent, or Firm* — Dickinson Wright PLLC (57) ABSTRACT

A manual park release handle system equipped with a mechanism for preventing the unintentional deployment of the manual park release system has: a base having an opening therethrough and a handle pivotally connected to the base, configured to pivot between a disengaged position and an engaged position. The handle is connected to a cable coupled to a park gear release within the automatic transmission of the vehicle. A tether strap is attached to the handle. A housing cover is attached to the base and has an aperture overlapped with a lock piece cylinder. The tether strap passes through the lock piece cylinder and the aperture, and is attached to a twist lock piece. The twist lock piece is configured to pass through the housing cover aperture and engage the lock piece cylinder and to disengage the lock piece cylinder by rotating the twist lock piece within the lock piece cylinder.

20 Claims, 12 Drawing Sheets

(56) References Cited

U.S. PATENT DOCUMENTS

| | | | |
|---|---|---|---|
| 2017/0001770 A1* | 1/2017 | Weisshaupt | G09F 3/0364 |
| 2017/0004903 A1* | 1/2017 | Suenaga | H01B 7/0045 |
| 2017/0219126 A1* | 8/2017 | Kato | B60R 16/08 |
| 2017/0314677 A1 | 11/2017 | Devos | |
| 2017/0350172 A1* | 12/2017 | Tamura | E05B 79/22 |
| 2018/0094724 A1 | 4/2018 | Devos | |
| 2018/0111645 A1* | 4/2018 | Arima | B65D 63/1063 |
| 2018/0119714 A1* | 5/2018 | Moreau | G09F 3/14 |
| 2019/0178378 A1* | 6/2019 | Legault | B60T 7/10 |
| 2020/0122701 A1* | 4/2020 | Alu | F16H 61/36 |
| 2020/0247358 A1* | 8/2020 | Alu | B60T 7/104 |
| 2021/0088137 A1* | 3/2021 | Alu | F16H 63/3491 |

* cited by examiner

MANUAL PARK RELEASE SYSTEM WITH TWIST LOCK MECHANISM

CROSS-REFERENCE TO RELATED APPLICATIONS

This application claims the benefit of priority under 35 U.S.C. § 119 to U.S. Provisional Application No. 62/961,756, filed Jan. 16, 2020, the contents of which are incorporated herein by reference in their entirety.

FIELD OF INVENTION

The present disclosure relates to a motor vehicle with a manual park release handle system equipped with a mechanism for preventing the unintentional deployment of the manual park release system.

BACKGROUND

Motor vehicles, such as trucks, cars, and other automobiles, equipped with an automatic transmission typically include a shifter for changing between available gear selections. Typical gear selections in an automatic transmission vehicle include park (P), reverse (R), neutral (N), drive (D), and low gears (1, 2). The shifter lever connects to the motor vehicle transmission by a suitable mechanical and/or electronic operating linkage to effect actuation of the transmission to the selected gear.

One drawback that automatic transmission vehicles face is the ability to easily put the car in neutral and allow the wheels to move freely when the car is turned off. In certain circumstances, such as when towing a vehicle, it is necessary that driven wheels be able to move freely without constraints from the transmission. One solution that has been developed to overcome this issue is a park gear release. The park gear release disengages the connection between the wheels and the transmission when the gear selector is in the park position, allowing the wheels to turn freely. However, park gear release systems face several different design constraints and issues.

One issue that such release systems have is providing an easily workable release handle while still keeping the design safe. For example, the release handle must be accessible to users, but needs to also be safely arranged to prevent accidental activation of the release. For that reason, it may be beneficial for the handle to be stored in a separate compartment and/or locked until used.

SUMMARY

A twist lock mechanism useful for preventing the accidental activation of a manual park release handle, for example, is disclosed. Only after disengaging the twist lock mechanism can a user activate the manual park release handle assembly, thereby disengaging the vehicle transmission from the wheels of the vehicle. Once disengaged from the transmission, the wheels can rotate freely and the vehicle can be towed or moved, independent of the gear setting of the transmission.

The twist lock mechanism may be compatible with a variety of manual park release handle assembly configurations. As an example, the twist lock feature may be compatible with the handle assembly disclosed in U.S. Pat. No. 10,094,471, which is incorporated herein by reference in its entirety. The twist lock mechanism may be used to prevent the unintentional activation of other motor vehicle systems in addition to manual park release handle assemblies.

The twist lock mechanism disclosed herein has a lock piece cylinder and a twist lock piece, which is configured to engage the lock piece cylinder by pressing the twist lock piece into the lock piece cylinder and to disengage the lock piece cylinder by rotating the twist lock piece within the lock piece cylinder. The lock piece cylinder has two interior diameters, with the second diameter being larger than the first such that the lock piece cylinder has a number of wedge-shaped indentations arranged circumferentially around the interior surface of the lock piece cylinder. The twist lock piece has a cylindrical end with two diameters, the second being larger than the first such that the cylindrical end of the twist lock piece has a number of wedge-shaped protrusions arranged around the circumference of the cylindrical end and then extend radially from the outer surface of the cylindrical end. The wedge-shaped indentations and protrusions are approximately the same shape and size, such that the protrusions fit into the indentations.

The manual park release handle assembly disclosed herein has a base with an opening therethrough and a handle, which is pivotally connected to the base. The handle pivots between a disengaged position and an engaged position, and is connected to a cable. The cable is connected at the opposite end to a park gear release within the automatic transmission of a vehicle. A housing cover attached to the base has a lock piece cylinder and a housing cover aperture overlapped with the lock piece cylinder. A tether strap is attached to the handle and passes through the lock piece cylinder and the housing cover aperture. A twist lock piece is attached to the tether strap at the end of the tether strap opposite the handle. The twist lock piece is configured to pass through the housing cover aperture and engage the lock piece cylinder. The twist lock piece is subsequently disengaged from the lock piece cylinder by rotating the twist lock piece within the lock piece cylinder.

The handle of the manual park release handle assembly is pivotable from the disengaged to the engaged position only after the twist lock piece is removed. The handle is pivoted by pulling either the twist lock piece or the attached tether strap. The pivoting of the handle to the engaged position actuates the park gear release within the automatic transmission, thereby decoupling the rotation of the wheels from the gear state of the automatic transmission.

BRIEF DESCRIPTION OF THE DRAWINGS

The invention is described in greater detail below with reference to the various embodiments illustrated in the appended drawings. In the drawings:

FIGS. 7A-7C show various orientations of the twist lock piece.

FIGS. 9A-9C show an angled isometric view of the twist lock piece in various stages of being removed from the lock piece cylinder.

FIGS. 10A-10C show a cross-sectional angled isometric view of the twist lock piece in various stages of being removed from the lock piece cylinder.

FIGS. 11A-11D show a cross-sectional angled isometric view of the twist lock piece in various stages of being removed from the lock piece cylinder.

The drawings provided herewith are for purely illustrative purposes and are not intended to limit the scope of the present invention.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments while remaining within the spirit and scope of the invention.

With reference to FIGS. 1-11, a twist lock mechanism may be included as a component of a manual park release handle assembly. The manual park release handle assembly may be mounted in a vehicle, such as within the cabin of a car, and accessible to a user.

Figure 1:
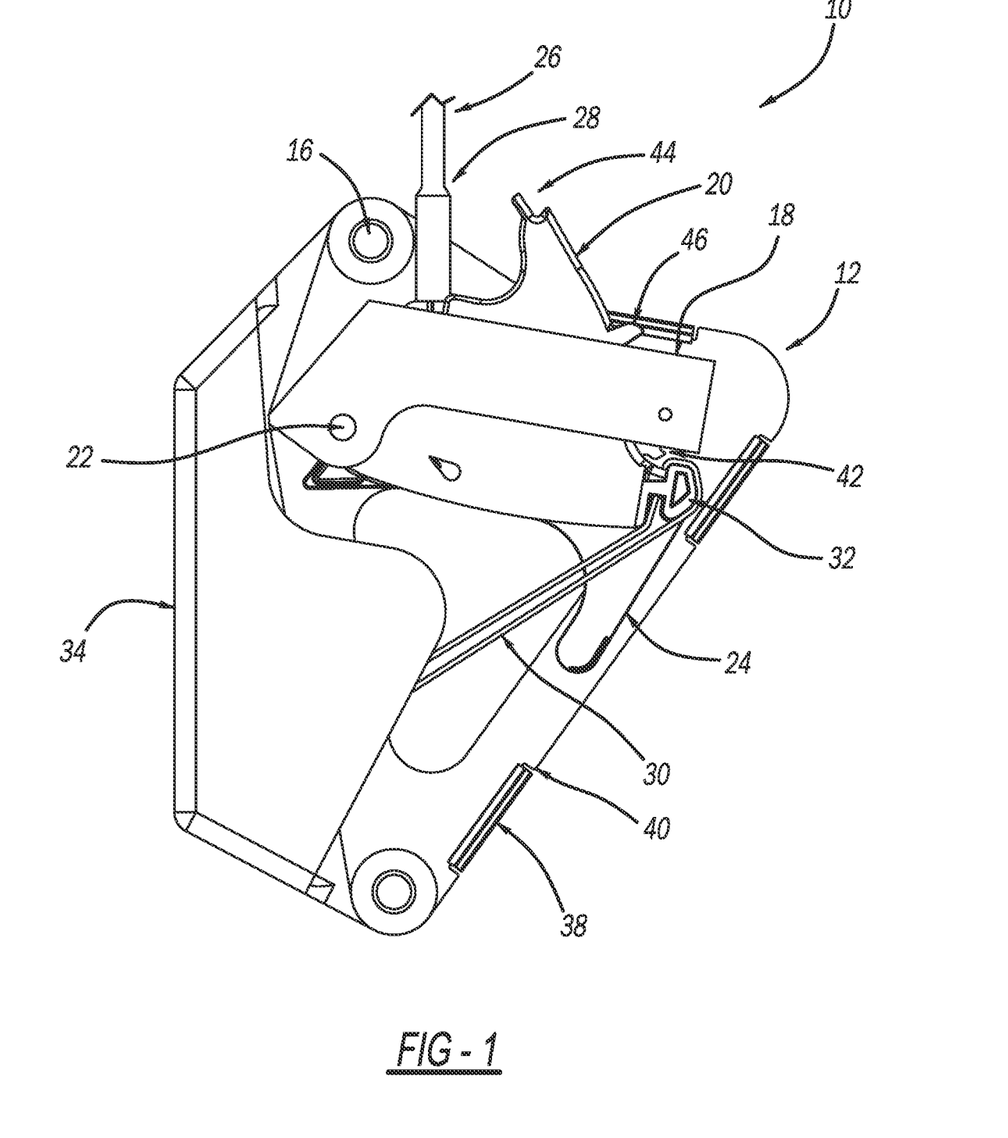
FIG. 1 shows a side view of the manual park release handle assembly with the handle in the disengaged position.
Figure 2:
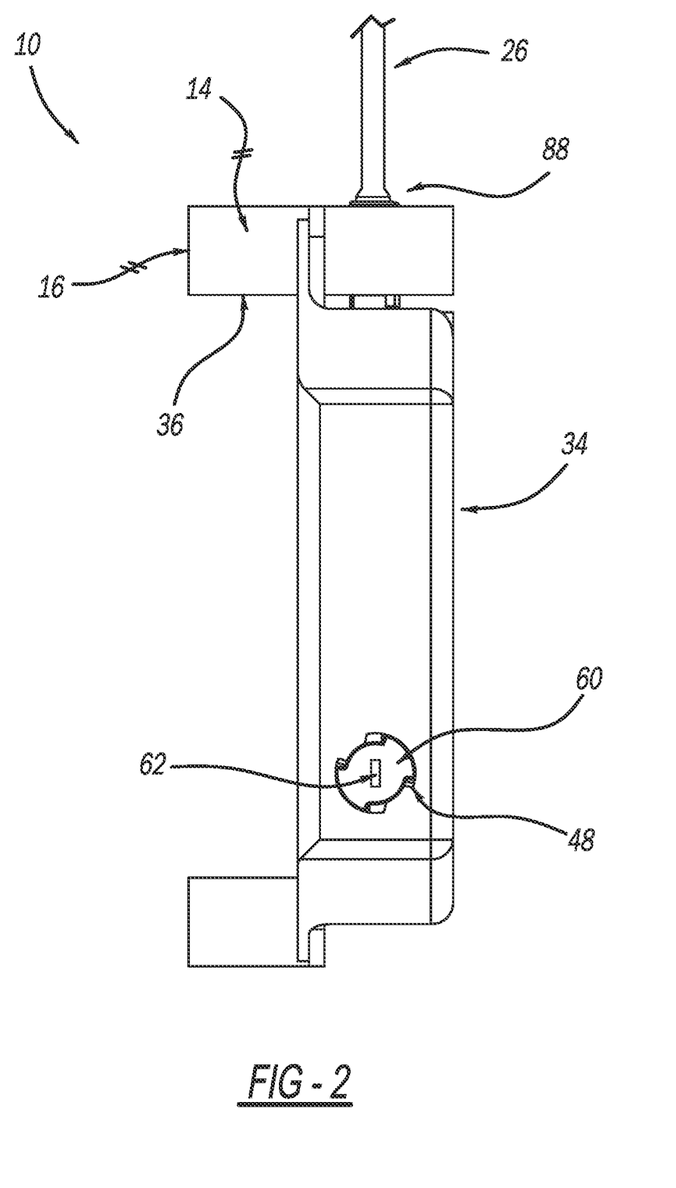
FIG. 2 shows a side view of the manual park release handle assembly with the twist lock engaged with the lock piece cylinder.

Referring to FIGS. 1 and 2, the manual park release handle assembly 10 equipped with a twist lock mechanism includes a base 12. The base 12 may be any appropriate size and shape, such as generally rectangular. The base 12 may be made out of any appropriate material, such as plastic, polymer, fiberglass, metal, or the like. The base 12 may be mounted at any appropriate location within the vehicle, such as in a confined compartment. The base 12 includes a number of base posts 14, which are uniformly continuous with the base 12 and protrude from a side face of the base 12. The base posts 14 have a first base post diameter. In a preferred embodiment, the base 12 includes two base posts 14. The base also includes a number of mounting apertures 16 for fixing the base 12 at a desired location within the vehicle. The mounting aperture 16 passes through a side of the base 12 and the uniformly continuous base post 14 protruding from the side of the base 12.

The base includes an opening 18. The opening 18 is generally rectangular and located in an upper portion of the base 12, oriented generally perpendicular to a front face of the base 12. The opening 18 extends completely through the base 12.

In some embodiments, the base 12 may be mounted in the passenger cabin of the vehicle. In some embodiments, the base 12 may be mounted to a lower kick panel of the vehicle, forward of a door. In one embodiment, the base 12 may be mounted to a left lower kick panel. In another embodiment, the base 12 may be mounted to a right lower kick panel.

Figure 3:
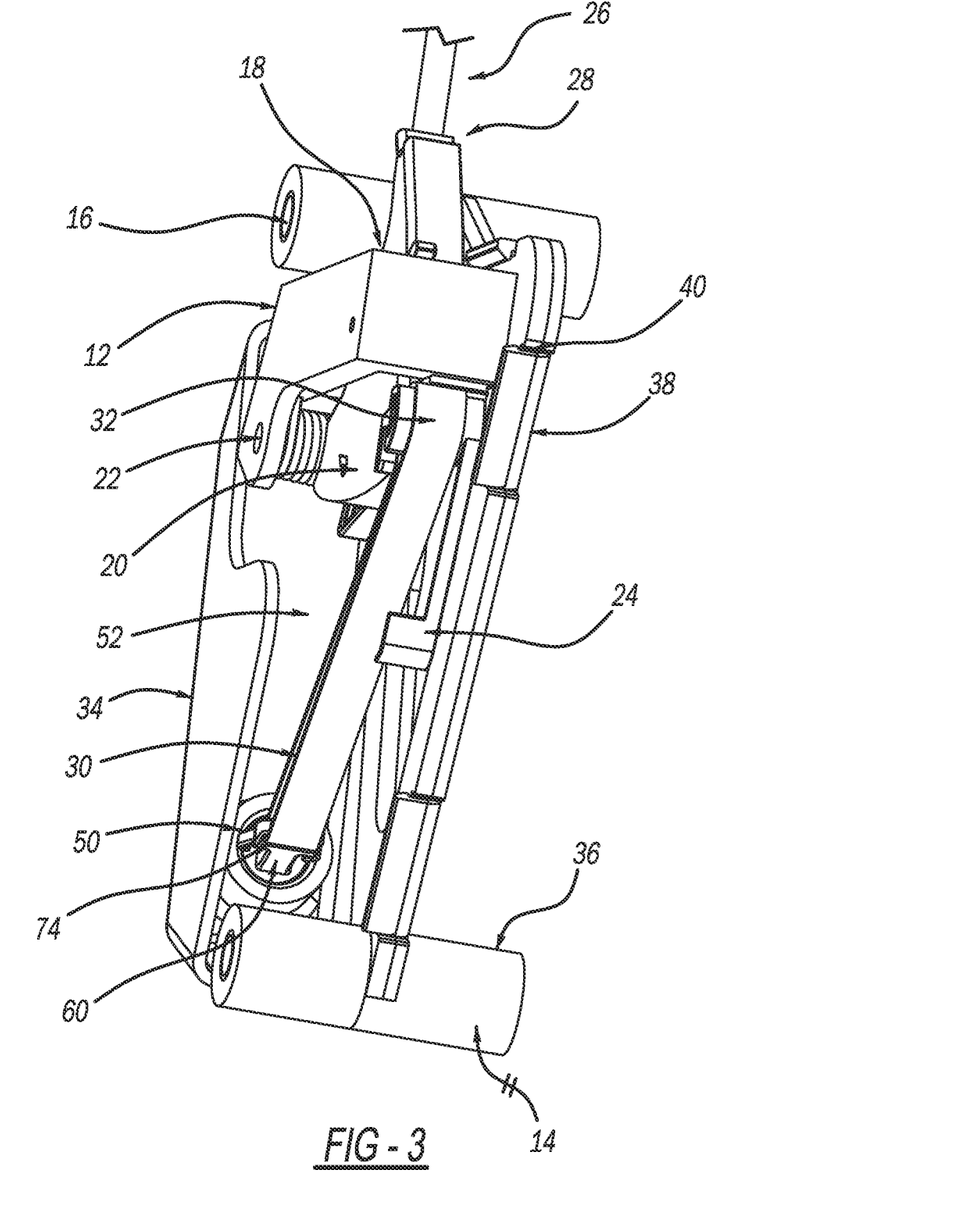
FIG. 3 shows an angled isometric view of the manual park release handle assembly with the handle in the disengaged position.
Figure 4:
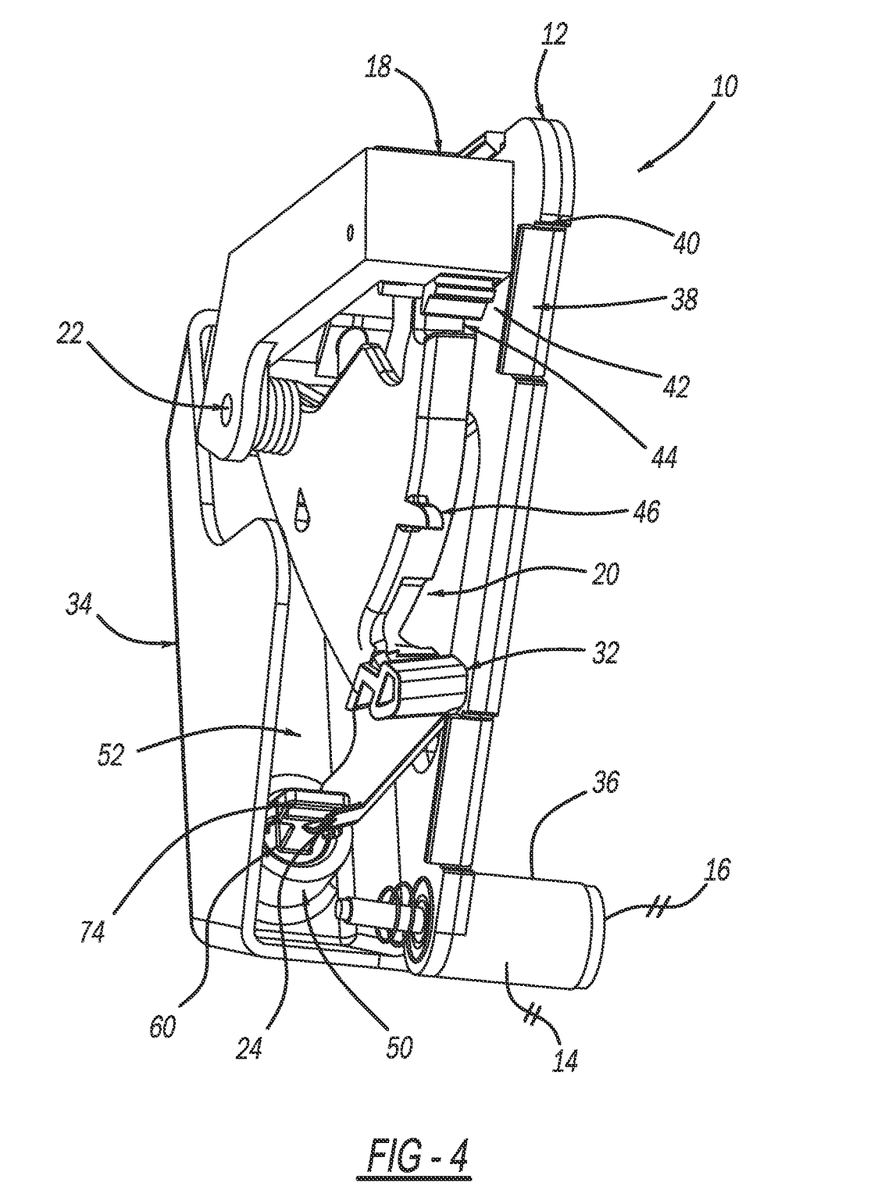
FIG. 4 shows an angled isometric view of the manual park release handle assembly with the handle in the engaged position.

The manual park release handle assembly 10 further includes a handle 20, made of any appropriate material, such as plastic, polymer, fiberglass, metal, or the like. The handle 20 is pivotally connected to the base 12. For example, as shown in FIG. 1, a pin 22 extends through the base 12 and through a forward portion of the handle 20. The handle 20 pivots about the pin 22 between a first disengaged position near an upper portion of the base 12, arranged as shown in FIGS. 1 and 3, and a second engaged position arranged as shown in FIG. 4.

The handle 20 includes a uniformly continuous handle tab 24 attached adjacent to a rear face of the handle 20 and oriented towards the bottom face of the base 12.

A cable 26 is attached to a portion of the handle 20. The cable 26 may be any appropriate type of cable, such as a steel-jacketed cable or the like. In some embodiments, the cable 26 is connected at a first end 28 to a top face of the handle 20, adjacent to the base 12. At a second end, the cable 26 is connected to a park release within the automatic transmission to disconnect the wheels of the vehicle from the transmission. When the handle 20 is pivoted between the disengaged and engaged positions, the cable 26 travels a distance to actuate the transmission release or reengage the transmission. For example, when the handle 20 is moved to the engaged position, tension is applied to the cable 26, actuating the transmission release, which releases the park feature of the vehicle and allows the wheels to move freely, independent of the transmission gear state. Pivoting the handle 20 to the disengaged position relieves the tension in the cable 26 and disengages the transmission release, reengaging the park feature of the vehicle, thereby preventing the free rotation of the wheels. The cable 26 may include a sheath that surrounds and protects the cable and allows the cable to move therein.

As shown in FIG. 1, a tether strap 30 is attached to a portion of the handle 20. The tether strap 30 may be made of any appropriate tether strap material, such as nylon webbing or the like. The tether strap 30 is secured to the handle 20 by looping it through an eyelet 32, or similar opening, in the handle 20. For example, a first end of the tether strap 30 is passed through the eyelet 32 and durably attached to a middle region of the tether strap 30, distal to a second end of the tether strap 30. In another embodiment, the first end of the tether strap 30 may be passed through the eyelet 32 and durably attached to a second end of the tether strap 30. The eyelet 32 in the handle 20 is located distal to the pin 22 pivotally securing the handle 20 to the base 12 and adjacent to a bottom face of the handle 20.

As shown in FIGS. 1-4, the manual park release handle assembly 10 also includes a housing cover 34. The housing cover 34 may be made of any appropriate material such as plastic, polymer, fiberglass, metal, or the like. The housing cover 34 includes housing cover posts 36, which are uniformly continuous with the housing cover 34 and protrude from a side face of the housing cover 34. In some embodiments, a post of the housing cover has a first diameter and a second diameter. The first diameter defines an outer surface of the housing cover post 36 and the second diameter defines an inner surface of the housing cover post 36, such that the interior of the housing cover post 36, defined by the width of the second diameter, is substantially hollow.

In some embodiments, the second diameter of the housing cover post 36 is about the first diameter of the base post 14. In some embodiments, the housing cover 34 is secured to the base 12 by slipping a number of housing cover posts 36 over a number of base posts 14, wherein the housing cover posts 36 include a mounting aperture overlapped with the mounting aperture 16 running through the side of the base 12 and the base posts 14. In other embodiments, the housing cover 34 may be secured to the base 12 by a number of tabs 38 interlocked over a number of corresponding grooves 40 on the surface of the base. In a preferred embodiment, as shown in FIGS. 1 and 2, the housing cover 38 is secured to the base 12 by both enveloping a number of base posts 14 with a number of housing cover posts 36 and by interlocking a number of plastic tabs 38 with a number of grooves 40.

As shown in FIGS. 1 and 4, the manual park release handle assembly 10 also includes a detent mechanism for the handle 20. The detent mechanism includes a lever 42, a handle stop 44, and a detent handle tab 46. The lever is attached to the base at a face of the opening 18 distal to the pin 22 pivotally securing the handle 20 to the base 12. The handle stop 44 is located near a top face of the handle 20 and adjacent to the cable 26 while the handle 20 is in the disengaged position, as shown in FIG. 1. The detent handle tab 46 is located on a top face of the handle 20 adjacent the opening 18 through the base 12 and is in between the handle stop 44 and the lever 42, while the handle 20 is in the disengaged position. When the handle 20 is actuated and pivoted from the disengaged position to the engaged position, the detent handle tab 46 moves the lever 42 into a downward orientation, engaging the handle stop 44 and locking the handle 20 in the engaged position, as shown in FIG. 4. Upon actuating the handle 20 a second time, the lever 42 is released from the handle stop 44 and the detent handle tab 46 moves the lever 42 to an upward orientation as the handle 20 is pivoted to the disengaged position, as shown in FIG. 1.

Figure 5:
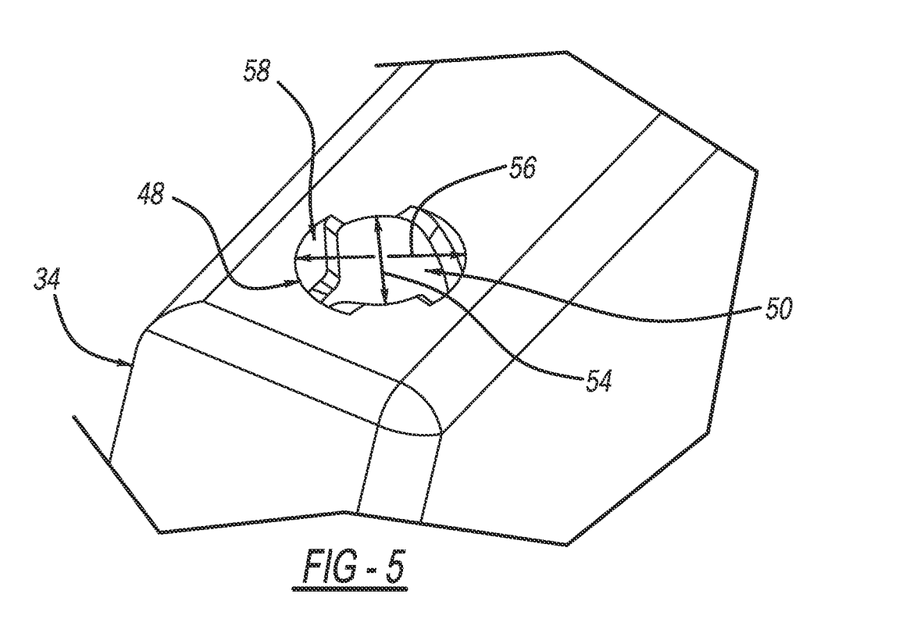
FIG. 5 shows an angled isometric view of the housing cover and lock piece cylinder.
Figure 6:
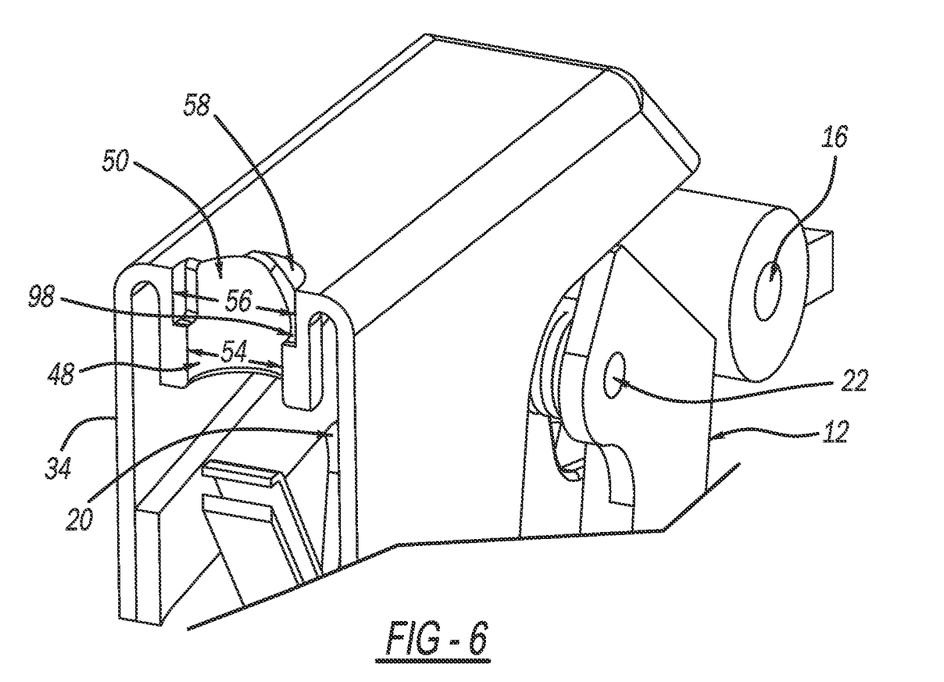
FIG. 6 shows a cross-sectional side view of the lock piece cylinder.

Turning to FIGS. 2-6, the housing cover 34 includes a housing cover aperture 48 or hole on a front face of the housing cover 34. The housing cover aperture 48 further includes a lock piece cylinder 50 uniformly continuous with the housing cover 34 that protrudes from a rear side 52 of the front face of the housing cover 34. The lock piece cylinder 50 has a first interior diameter 54 over a portion of an interior surface of the lock piece cylinder 50 that is smaller than a second interior diameter 56 of the lock piece cylinder 50, such that the lock piece cylinder 50 has a number of approximately wedge-shaped indentations 58 arranged circumfrentially along the interior surface of the lock piece cylinder 50, as shown in FIGS. 5 and 6. In a preferred embodiment, the lock piece cylinder 18 has two wedge-shaped indentations 58, as depicted in FIG. 5.

The manual park release handle assembly 10 also includes a twist lock piece 60, as shown in FIGS. 2-4 and 7. The twist lock piece 60 may be made of any appropriate material, such as plastic, polymer, fiberglass, metal, or the like. A front face of the twist lock piece has an oblong recess in the surface of the front face 62, as shown in FIGS. 2 and 7B.

Figures 7A, 7B, 7C:
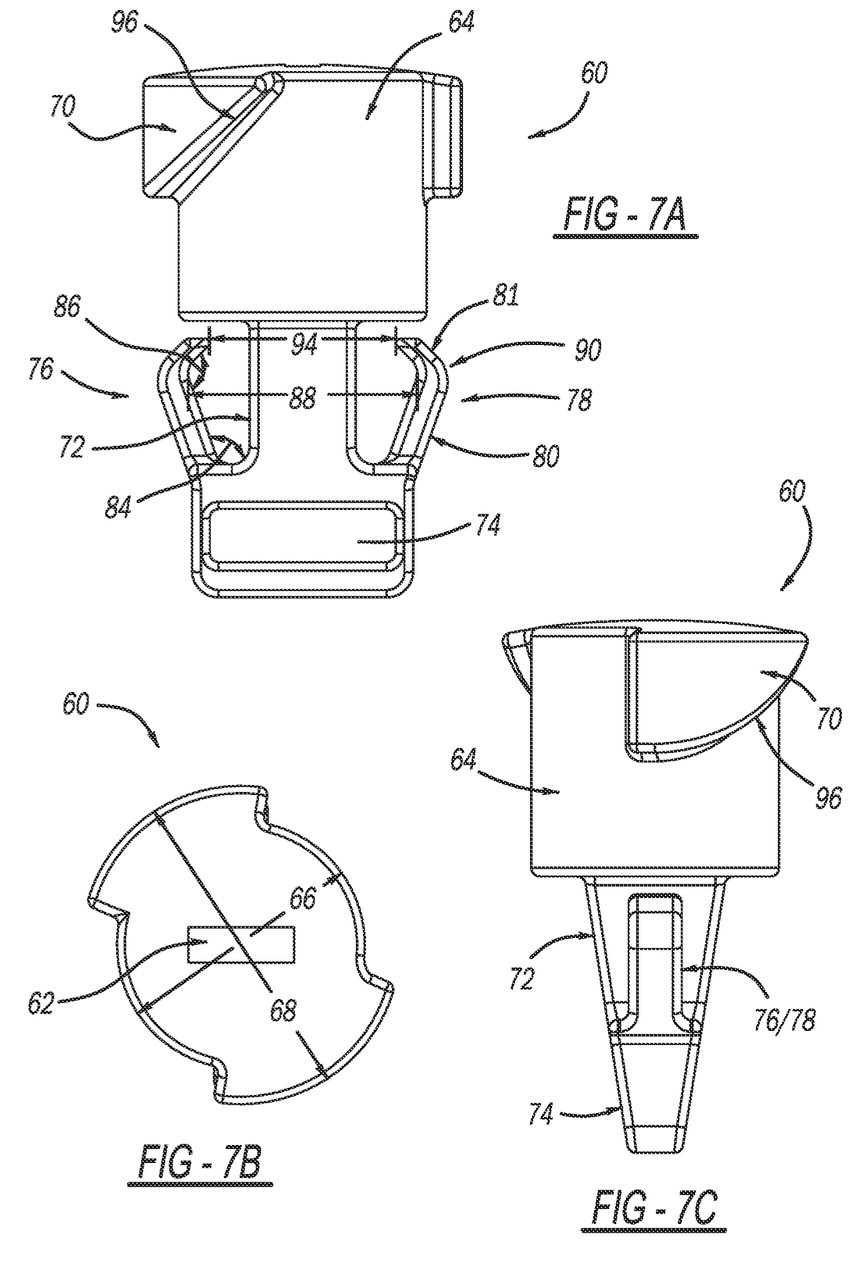
FIG. 7A shows a side view of the twist lock piece.
FIG. 7B shows a top view of the twist lock piece.
FIG. 7C shows a side view of the twist lock piece.

Turning to FIGS. 7A and 7B, the twist lock piece 60 is cylindrical in shape at a first end 64 with a first twist lock piece diameter 66 that is smaller than a second twist lock piece diameter 68, such that the twist lock piece 60 has a number of approximately wedge-shaped protrusions 70 that extend radially from a surface of the cylindrical first end 64 along the transverse axis of the twist lock piece 60. The first and second twist lock piece diameters 66 and 68 are approximately the same length as the first and second lock piece cylinder interior diameters 54 and 56, such that the wedge-shaped protrusions 70 of the twist lock piece are substantially the same shape as the wedge-shaped indentations 58 of the lock piece cylinder 50.

Extending distally from the cylindrical first end 64 of the twist lock piece 60 is a connecting element 72 that terminates in an eyelet 74, or the like, for securing the tether strap 30 to the twist lock piece 60. The tether strap 30 is passed through the housing cover aperture 48 and secured to the twist lock piece 60. As above, the tether strap 30 may be secured to the twist lock piece 60 by passing a second end of the tether strap 30 through the eyelet 74 of the twist lock piece 60 and durably attaching the second end to a middle region of the tether strap 30. In another embodiment, a first end of the tether strap 30 may be passed through the eyelet 32 of the handle 20 and a second end of the tether strap 30 may be passed through the eyelet 74 of the twist lock piece 60 and the first and second ends durably attached to one another.

Figure 8:
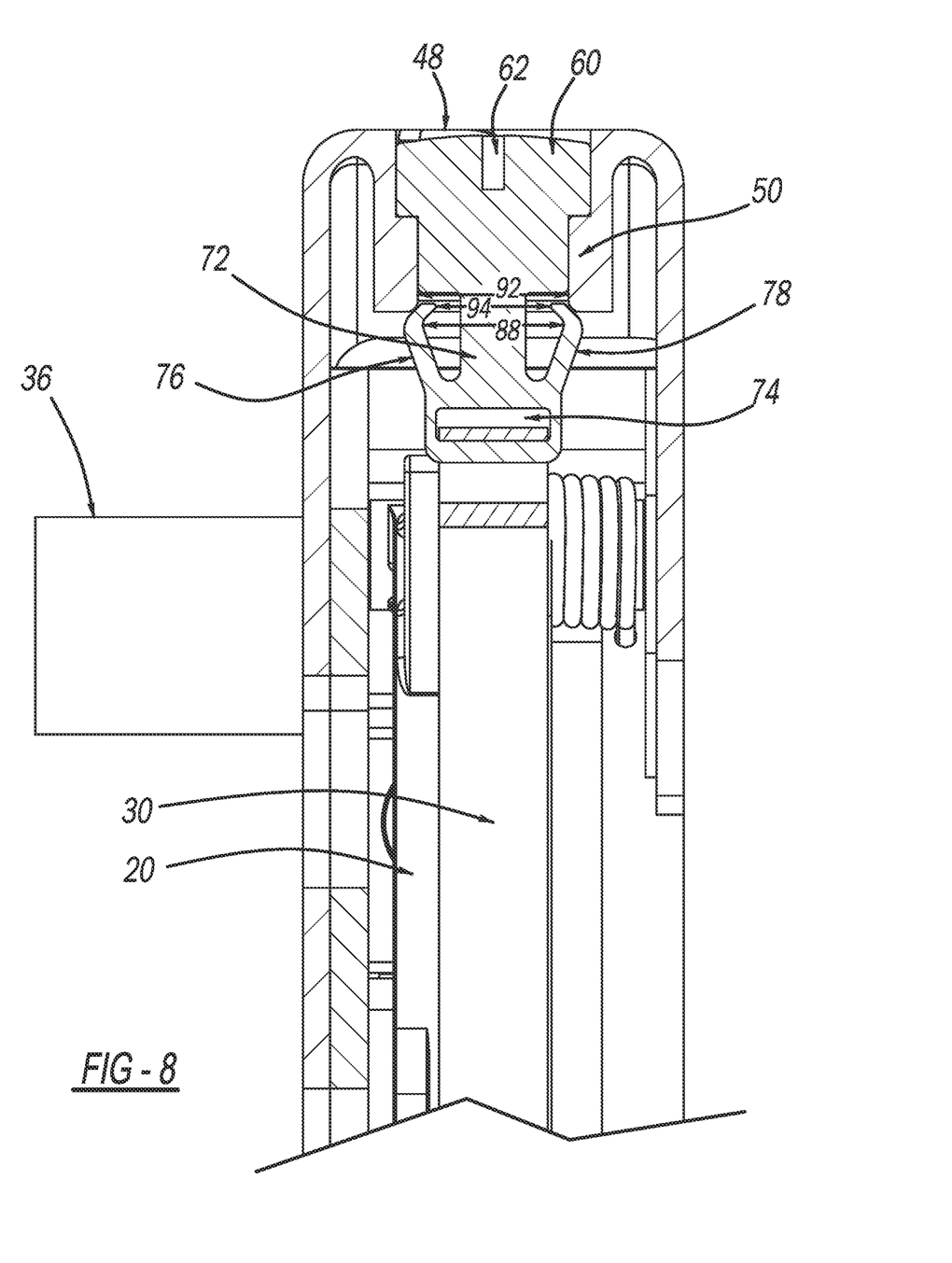
FIG. 8 shows a close-up, cross-sectional top view of the twist lock piece engaged with the lock piece cylinder.
Figure 10A:
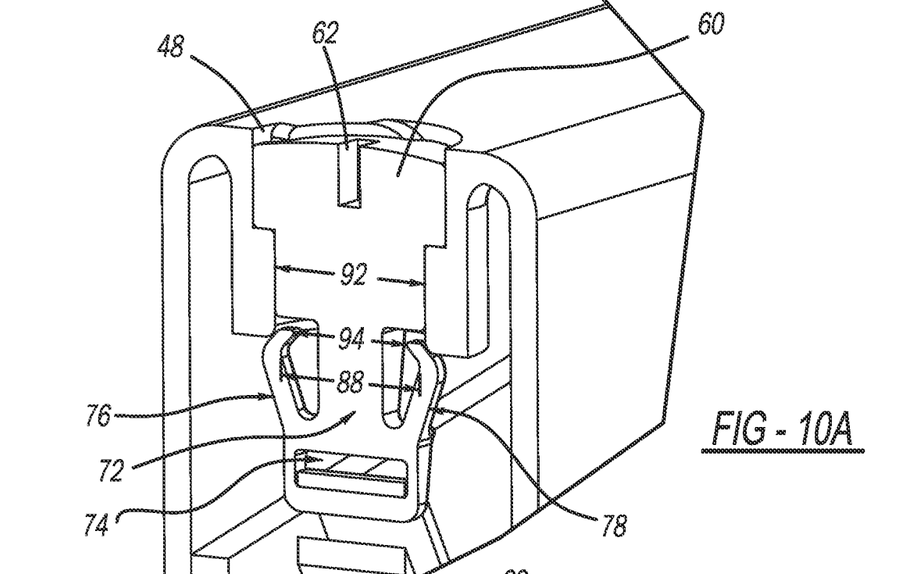
FIG. 10A shows twist lock piece fully engaged with the lock piece cylinder.

Extending toward the cylindrical first end 64 of the twist lock piece 60, from a surface of the twist lock piece eyelet 74, are a first tab 76 and a second tab 78. The first tab 76 and second tab 78 are arranged on opposite ends of the eyelet 74 surface and each has a first segment 80 extending from the eyelet 74 surface and a second segment 81 attached to the first segment 80 and proximal to the cylindrical first end 64 of the twist lock piece 60. The second segment 81 is shorter in length than the first segment 80. The first segment 80 is arranged at a first angle 84, which points the first segment 80 away from the center of the twist lock piece 60, as shown in FIG. 7A. The second segment 81 is arranged at a second angle 86, which points the second segment 81 toward the center of the twist lock piece 60. A first width 88 between the first tab 76 and the second tab 78, measured between the tabs 76,78 at the intersection 90 of the first segment 80 and second segment 81, is greater than a diameter 92 of the lock piece cylinder 50 while the twist lock piece 60 is fully engaged with the lock piece cylinder 50, as shown in FIGS. 8 and 10A. While the twist lock piece 60 is in a transitional state of being disengaged from the lock piece cylinder 50, the first width 88 is less than or approximately equal to the diameter 92 of the lock piece cylinder 18. A second width 94 between the first tab 76 and second tab 78, measured between the tabs 76 and 78 at the ends of the second segment 81 proximal to the cylindrical first end 64 of the twist lock piece 60, is less than a diameter 92 of the lock piece cylinder 50, as shown in FIGS. 8 and 10A.

The twist lock piece 60 is engaged with the lock piece cylinder 50 by passing the first tab 76 and second tab 78 of the twist lock piece 60 through the housing cover aperture 48 such that they pass through an opening at an end distal to the housing cover 34 of the lock piece cylinder 50 and the wedge-shaped protrusions 70 of the twist lock piece 60 fit into the wedge-shaped indentations 58 of the lock piece cylinder 50. The first tab 76 and second tab 78 of the twist lock piece thereby interlock the twist lock piece with the lock piece cylinder.

The twist lock piece 60 is disengaged from the lock piece cylinder 50 by inserting a tool, such as a screwdriver, a tip of a key, or the like, into the oblong recess 62 on the front face of the twist lock piece 60 and rotating the tool. The twist lock piece 60 may be configured such that a tool is required to disengage the twist lock piece 60 from the lock piece cylinder 50 and the twist lock piece 60 cannot be disengaged by manipulation with a finger nail or hand, for example, by adjusting the thickness of the first tab 76 and the second tab 78, or the second angle 86 between first and second segments 80 and 81.

Figures 9A, 9B:
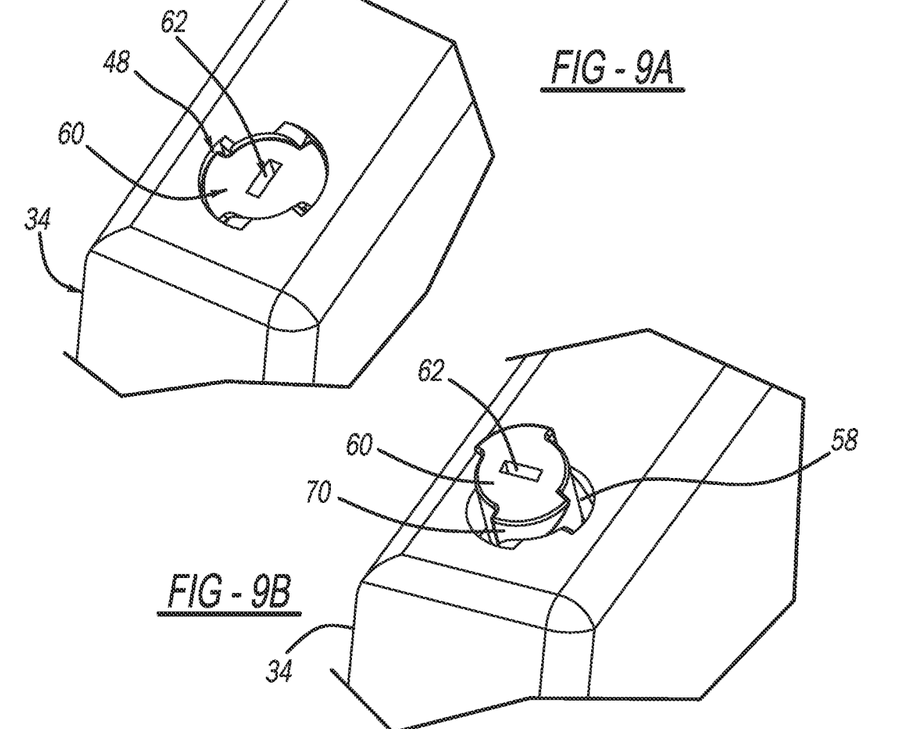
FIG. 9A shows the twist lock piece fully engaged with the lock piece cylinder.
FIG. 9B shows the twist lock piece half-disengaged from the lock piece cylinder.
Figure 9C:
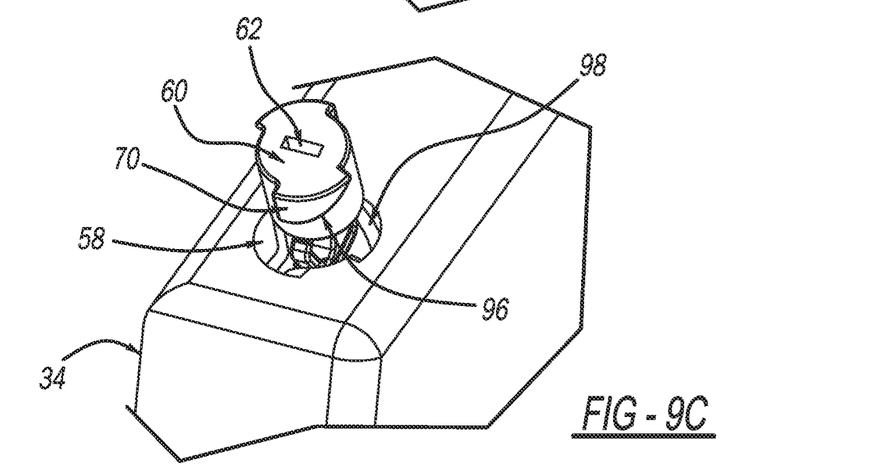
FIG. 9C shows the twist lock piece fully disengaged from the lock piece cylinder.
Figure 10B:
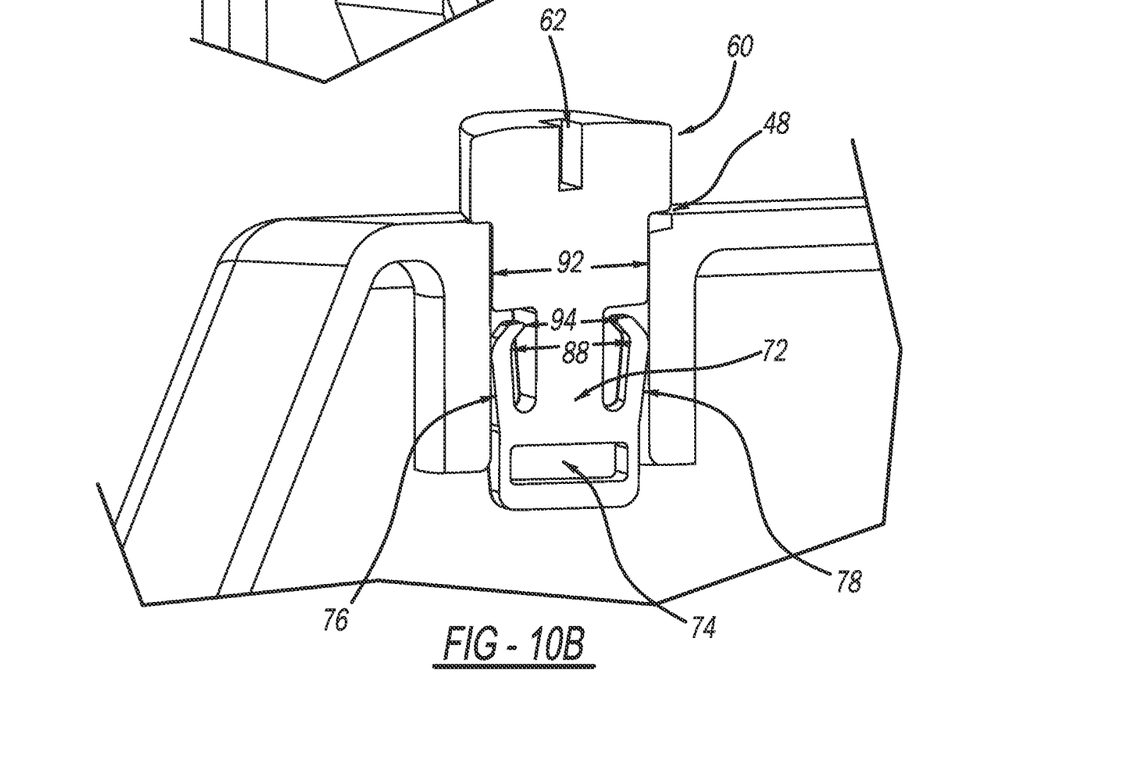
FIG. 10B shows the twist lock piece half-disengaged from the lock piece cylinder.
Figure 10C:
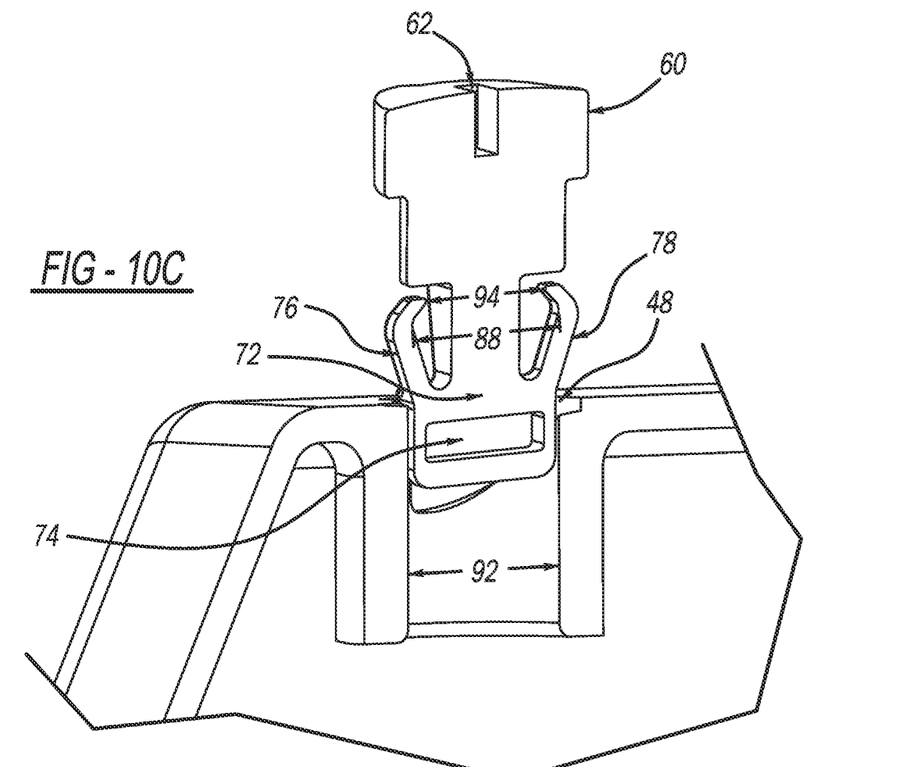
FIG. 10C shows the twist lock piece fully disengaged from the lock piece cylinder.
Figure 11A:
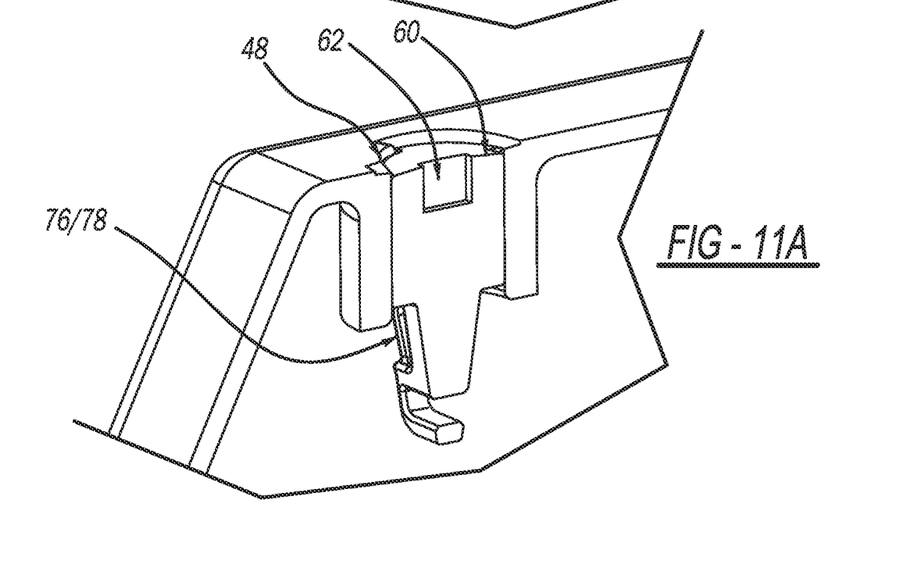
FIG. 11A shows twist lock piece fully engaged with the lock piece cylinder.
Figure 11B:
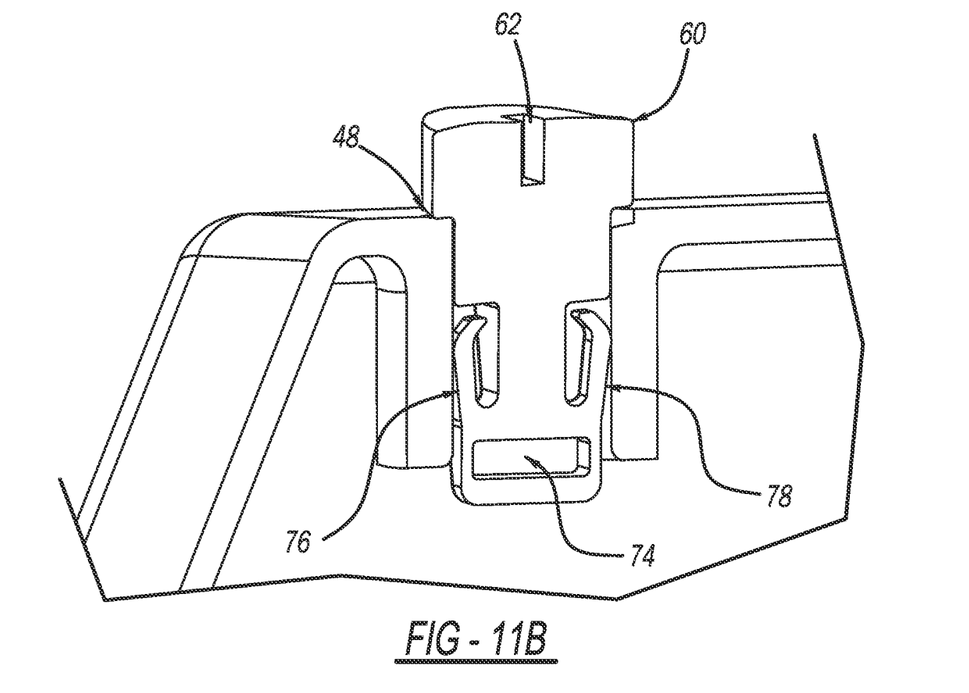
FIG. 11B shows the twist lock piece partially disengaged from the lock piece cylinder.
Figure 11C:
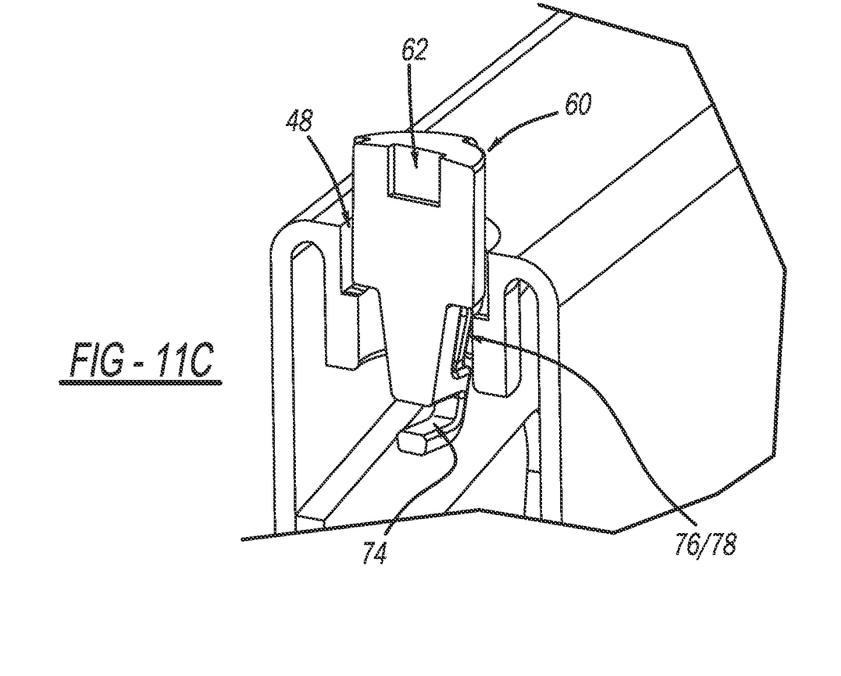
FIG. 11C shows the twist lock piece half-disengaged from the lock piece cylinder.
Figure 11D:
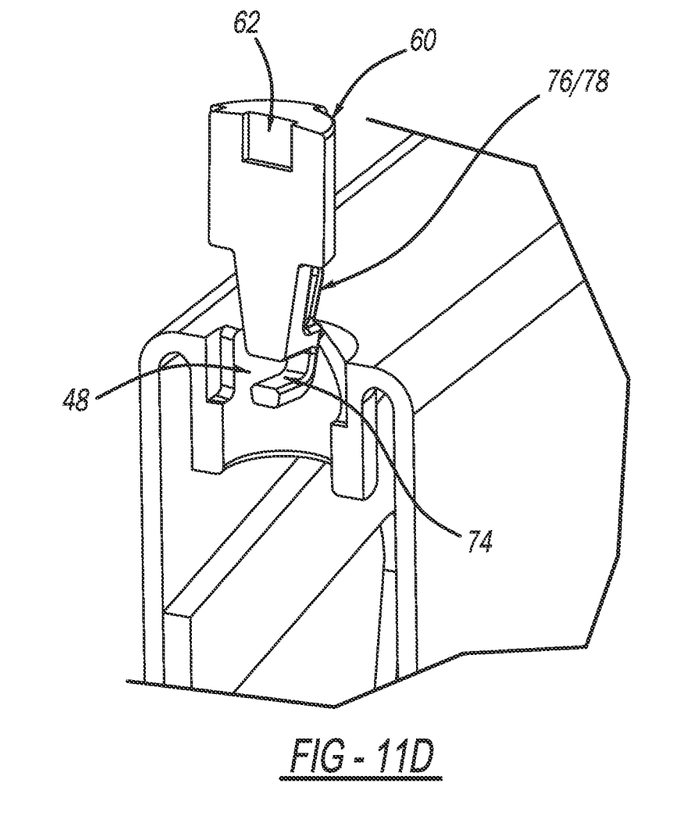
FIG. 11D shows the twist lock piece fully disengaged from the lock piece cylinder.

As shown in FIGS. 9-11, the torque applied by the tool slides an angled portion 96 of the wedge-shaped protrusion 70 of the twist lock piece 60 against a complementarily angled portion 98 of the wedge-shaped indentation 58 of the lock piece cylinder 50. The sliding motion of the wedge-shaped protrusion 70 against the wedge-shaped indentation 58 forces the twist lock piece 60 to begin protruding from the housing cover aperture 48 and away from the lock piece cylinder 50. As the twist lock piece 60 is forced out of the lock piece cylinder 50, the first tab 76 and second tab 78 are pulled into the lock piece cylinder 50 toward the housing cover aperture 48, such that the point of contact between the lock piece cylinder 50 and the second segment 81 of the first tab 76 and second tab 78 moves from a region near the end of the second segment 81 towards the intersection 90 of the first segment 80 and second segment 81. As the point of contact between the second segment 81 and lock piece cylinder 50 shifts towards the intersection 90 of the first segment 80 and second segment 81, a compressive force is applied to the first tab 76 and second tab 78, decreasing the first angle 84 of the first segment 80, thereby compressing the tabs towards the connecting element 72 and reducing the first width 88 between the first and second tabs 76 and 78. Once the first width 88 is less than a diameter 92 of the lock piece cylinder 50, the twist lock piece 60 is ejected from the lock piece cylinder 50.

In some embodiments, the twist lock piece 60 may be disengaged from the lock piece cylinder 50 by turning the tool in a clockwise direction. In some embodiments, the twist lock piece 60 may be disengaged from the lock piece cylinder 50 by turning the tool in a counter-clockwise direction.

In some embodiments, the twist lock piece 60 may be disengaged from the lock piece cylinder 50 by turning the twist lock piece 60 ½ turn around the circumference of the lock piece cylinder 50. In other embodiments, the twist lock piece 60 may be disengaged from the lock piece cylinder 50 by turning the twist lock piece 60 ⅓ turn around the circumference of the lock piece cylinder 50. In a preferred embodiment, the twist lock piece 60 is disengaged from the lock piece cylinder 50 by turning the twist lock piece 60 ¼ turn around the circumference of the lock piece cylinder 50.

The torque required to disengage the twist lock piece 60 from the lock piece cylinder 50 may be modulated by altering a thickness and/or the second angle 86 of the second segment 81 of the first tab 76 and the second tab 78. In some embodiments, the torque required to disengage the twist lock piece 60 from the lock piece cylinder 50 may be about 5 Nm to about 15 Nm. In other embodiments, the torque required to disengage the twist lock piece 60 from the lock piece cylinder 50 may be about 6 Nm to about 9 Nm. In a preferred embodiment, the torque required to disengage the twist lock piece 60 from the lock piece cylinder 50 is about 7.5 Nm.

In some embodiments, the twist lock piece 60 may be configured such that the torque required to disengage the twist lock piece 60 from the lock piece cylinder 50 does not decrease below a specified requirement over at least 10 operations. In some embodiments, the twist lock piece 60 may be configured such that the torque required to disengage the twist lock piece 60 from the lock piece cylinder 50 does not decrease below a specified requirement over at least 15 operations. In a preferred embodiment, the twist lock piece 60 is configured such that the torque required to disengage the twist lock piece 60 from the lock piece cylinder 50 does not decrease below a specified requirement over at least 20 operations.

After the twist lock piece 60 has been disengaged from the lock piece cylinder 50, the handle 20 may be actuated by pulling the twist lock piece 60 and/or the connected tether strap 30, thereby moving the handle 20 to the engaged position, as shown in FIG. 4, and disengaging the transmission from the wheels of the vehicle, as described above.

In some embodiments, the handle 20 may be locked in the engaged position by any appropriate mechanism after being actuated. In some embodiments, the handle 20 is locked in the engaged position via the detent mechanism described above. Alternative mechanisms by which the locking of the handle 20 in the engaged position is achieved are beyond the scope of this disclosure, but may also include the mechanism disclosed in U.S. Pat. No. 10,094,471, for example.

In some embodiments, the twist lock piece 60 cannot be engaged with the lock piece cylinder 50 while the handle 20 remains in the engaged position. In a preferred embodiment, the handle tab 24 is pointed at the lock piece cylinder 50 while the handle 20 is in the engaged position, as shown in FIG. 4. The handle tab 24 is thereby in sufficient proximity to an opening on the rear face of the lock piece cylinder 50 such that the handle tab 24 physically blocks the complete passage of the twist lock piece eyelet 74 through the lock piece cylinder 50, as shown in FIG. 4. The twist lock piece 60 can be engaged with the lock piece cylinder 50 only after the handle 20 has been returned to the disengaged position, as shown in FIGS. 1 and 3.

In some embodiments the handle 20 is returned to the disengaged position by pulling the twist lock piece 60 and/or the tether strap 30 a second time, via any appropriate mechanism, such as those described above for the detent mechanism or as disclosed in the aforementioned U.S. Pat. No. 10,094,471 reference.

In some embodiments, the twist lock piece 60 may be engaged with the lock piece cylinder 50 without the use of a tool. In a preferred embodiment, the twist lock piece 60 is engaged with the lock piece cylinder 50 by pressing the twist lock piece 60 into the lock piece cylinder 50, which slides the wedge-shaped protrusions 70 of the twist lock piece 60 along the wedge-shaped indentations 58 of the lock piece cylinder 50 in a direction opposite the direction of the sliding motion to disengage the twist lock piece 60 from the lock piece cylinder 50, thereby guiding the twist lock piece 60 into the lock piece cylinder 50 and the first tab 76 and second tab 78 beyond the opening of the lock piece cylinder 50 distal to the front face of the housing cover 34.

In some embodiments, the front face of the housing cover 34 and the twist lock piece 60 are obscured by a trim panel. The trim panel may be made of any appropriate material, such as plastic, polymer, or the like. In some embodiments, the trim panel is flush with the panel to which the base 12 is mounted. In some embodiments, the trim panel is made of the same material as the vehicle panel to which the base 12 is mounted.

While the above description constitutes the preferred embodiments of the present invention, it will be appreciated that the invention is susceptible to modification, variation and change without departing from the proper scope and fair meaning of the accompanying claims.

We claim:

1. A twist lock mechanism configured to prevent an accidental activation of a motor vehicle control system comprising:
   a lock piece cylinder having a number of wedge-shaped indentations arranged circumferentially around an interior surface of the lock piece cylinder; and
   a twist lock piece comprising:
      a cylindrical end having a number of wedge-shaped protrusions extending radially from an outer surface of the cylindrical end of the twist lock piece;
      a connecting element attached to the cylindrical end at a first connecting element end and to an eyelet at a second connecting element end distal to the cylindrical end of the twist lock piece; and
      a first tab and a second tab attached to a surface of the eyelet proximal to the cylindrical end;
   wherein:
      the twist lock piece is configured to engage the lock piece cylinder by pressing the twist lock piece into the lock piece cylinder; and
      the twist lock piece is configured to disengage the lock piece cylinder by rotating the twist lock piece within the lock piece cylinder.

2. The twist lock mechanism of claim 1, wherein the cylindrical end, the connecting element, the eyelet, and the first and second tabs are formed of a uniformly continuous material.

3. The twist lock mechanism of claim 1, wherein the number of wedge-shaped indentations and the number of wedge-shaped protrusions are of substantially a same shape and size and are configured such that the wedge-shaped protrusions fit into the wedge-shaped indentations when the twist lock piece is engaged with the lock piece cylinder.

4. The twist lock mechanism of claim 3, wherein the number of wedge-shaped indentations and the number of wedge-shaped indentations are each respectively two.

5. The twist lock mechanism of claim 1, wherein the first and second tabs each comprise a first segment attached at a first segment first end to the surface of the eyelet and a second segment attached at a second segment first end to a first segment second end, the second segment being shorter in length than the first segment.

6. The twist lock mechanism of claim 5, wherein the first segment is arranged at a first angle pointed away from a center of the twist lock piece and the second segment is arranged at a second angle pointed towards the center of the twist lock piece.

7. The twist lock mechanism of claim 6, wherein a first width measured between the first and second tabs at an intersection of the first and second segments of both the first and second tabs is greater than a diameter of the lock piece cylinder.

8. The twist lock mechanism of claim 7, wherein the twist lock piece and the lock piece cylinder are configured such that the first and second tabs are located beyond an open end of the lock piece cylinder distal to the cylindrical end when the twist lock piece is engaged with the lock piece cylinder.

9. The twist lock mechanism of claim 1, wherein the twist lock piece further comprises an oblong recess on a front face of the twist lock piece.

10. The twist lock mechanism of claim 9, wherein the twist lock piece is configured to disengage from the lock piece cylinder by inserting a tool into the oblong recess and rotating the tool, thereby applying a torque to the twist lock piece.

11. The twist lock mechanism of claim 9, wherein the twist lock piece is configured to rotate an about ¼ turn around a circumference of the lock piece cylinder to disengage the twist lock piece from the lock piece cylinder.

12. A manual park release handle assembly for a motor vehicle comprising the twist lock mechanism of claim 1.

13. A manual park release handle assembly for a motor vehicle comprising:
   a base having an opening therethrough;
   a handle pivotally connected to the base and configured to pivot between a disengaged position and an engaged position, the handle being connected to a cable configured to be operatively coupled to a park gear release within an automatic transmission of the motor vehicle;
   a tether strap attached to the handle;
   a housing cover attached to and substantially disposed around the base, the housing cover comprising:
      a lock piece cylinder; and
      a housing cover aperture overlapped with the lock piece cylinder, wherein the tether strap passes through the lock piece cylinder and the housing cover aperture; and
   a twist lock piece attached to the tether strap, wherein the twist lock piece is configured to pass through the housing cover aperture and engage the lock piece cylinder, and is configured to disengage from the lock piece cylinder by rotating the twist lock piece within the lock piece cylinder.

14. The manual park release handle assembly of claim 13, wherein the lock piece cylinder further comprises a number of wedge-shaped indentations arranged circumfrentially around an interior surface of the lock piece cylinder and the twist lock piece further comprises a number of wedge-shaped protrusions extending radially from a surface of the twist lock piece along a transverse axis of the twist lock piece.

15. The manual park release handle assembly of claim 14, wherein the wedge-shaped indentations and the wedge-shaped protrusions are of substantially a same shape and size and are configured such that the wedge-shaped protrusions fit into the wedge-shaped indentations when the twist lock piece is engaged with the lock piece cylinder.

16. The manual park release handle assembly of claim 13, wherein the twist lock piece further comprises a first tab and a second tab attached to the twist lock piece adjacent a second end of the twist lock piece, wherein the first tab and the second tab each comprise a first segment attached to the twist lock piece and a second segment attached to the first segment, the second segment being shorter in length than the first segment.

17. The manual park release handle assembly of claim 16, wherein a first width measured between the first tab and the second tab at an intersection of the first segment and the second segment of both the first tab and the second tab is greater than a diameter of the lock piece cylinder.

18. The manual park release handle assembly of claim 13, wherein the twist lock piece comprises an oblong recess on a front face of the twist lock piece and the twist lock piece is configured to disengage from the lock piece cylinder by inserting a tool into the oblong recess and rotating the tool.

19. The manual park release handle assembly of claim 13, wherein the handle is configured to remain locked in the engaged position after a first actuation of the handle and to be released to the disengaged position by a second actuation of the handle.

20. The manual park release handle assembly of claim 13, wherein the handle further comprises a handle tab uniformly continuous with the handle and located adjacent a rear face of the handle and pointed toward a bottom face of the base, configured to physically block a passage of an eyelet attached to the twist lock piece through the lock piece cylinder while the handle is in the engaged position.

* * * * *